US012175083B2

(12) United States Patent
Armangau et al.

(10) Patent No.: US 12,175,083 B2
(45) Date of Patent: Dec. 24, 2024

(54) NATIVE PIPELINE ELEMENT ABSTRACT SUPPORT IN STORAGE SYSTEM

(71) Applicant: Dell Products L.P., Round Rock, TX (US)

(72) Inventors: Philippe Armangau, Kalispell, MT (US); Vasu Subramanian, Chapel Hill, NC (US); Alan L. Taylor, Cary, NC (US); Amihay Azruel, Raanana (IL)

(73) Assignee: Dell Products L.P., Round Rock, TX (US)

( * ) Notice: Subject to any disclaimer, the term of this patent is extended or adjusted under 35 U.S.C. 154(b) by 72 days.

(21) Appl. No.: 18/070,674

(22) Filed: Nov. 29, 2022

(65) Prior Publication Data

US 2024/0176492 A1 May 30, 2024

(51) Int. Cl.
G06F 3/06 (2006.01)
(52) U.S. Cl.
CPC .......... G06F 3/0613 (2013.01); G06F 3/0659 (2013.01); G06F 3/0673 (2013.01)
(58) Field of Classification Search
CPC ..... G06F 3/0659; G06F 3/0673; G06F 3/0613
USPC ....................................................... 711/169
See application file for complete search history.

(56) References Cited

U.S. PATENT DOCUMENTS

| | | | |
|---|---|---|---|
| 10,091,297 B1 | 10/2018 | Zhao et al. | |
| 10,572,180 B1* | 2/2020 | Nemawarkar | G06F 3/0659 |
| 11,061,602 B2 | 7/2021 | Krasner et al. | |
| 11,442,819 B2 | 9/2022 | Chopra et al. | |
| 2014/0331001 A1* | 11/2014 | Liu | G06F 3/0659 |
| | | | 711/103 |
| 2016/0291977 A1* | 10/2016 | Bai | G06F 3/0604 |
| 2022/0237091 A1 | 7/2022 | Nuthakki et al. | |
| 2022/0244850 A1 | 8/2022 | Akash et al. | |

* cited by examiner

Primary Examiner — Gautam Sain
(74) Attorney, Agent, or Firm — BainwoodHuang

(57) ABSTRACT

Techniques for supporting a native pipeline element abstract for use in processing and storing data objects in a storage environment. The techniques include providing a data object processing pipeline for execution on a storage system, ingesting, by the data object processing pipeline, data objects collected by a plurality of computerized devices coupled to the storage system, performing queuing and processing of the data objects at a series of processing elements of the data object processing pipeline, and providing the processed data objects from the storage system to a host computer for subsequent use or analysis. In this way, the number of storage requests needed to be handled by the storage system can be reduced. Moreover, because the data object processing pipeline can be implemented and executed on the storage system, the processing and storage of data objects in the storage environment can be performed more efficiently and optimized more easily.

20 Claims, 3 Drawing Sheets

NATIVE PIPELINE ELEMENT ABSTRACT SUPPORT IN STORAGE SYSTEM

BACKGROUND

Storage systems include storage processing circuitry and arrays of storage devices such as solid-state drives (SSDs), hard disk drives (HDDs), optical drives, and so on. The storage processing circuitry typically services storage input/output (IO) requests generated by client (or "host") computers communicably coupled to the storage systems by at least one network. The storage IO requests (e.g., read requests, write requests) specify data blocks, data files, data pages, or other data objects to be read from or written to volumes (VOLs), logical units (LUNs), filesystems, or other storage objects maintained on the storage devices. Such data objects may correspond to data or information collected over the Internet of Things (IoT), which is a network of distributed physical computerized devices (also referred to herein as "IoT devices") configured to sense and collect such data or information for use in processes such as surveillance, medical and transportation monitoring, and home and factory monitoring and control. By analyzing the collected data or information, useful insights may be obtained pertaining to process efficiency and/or cost, as well as prevention and/or identification of potential process bottlenecks, faulty equipment or machinery, and so on.

SUMMARY

In an IoT environment, many IoT devices (e.g., up to a million or more) can stream their collected data over the IoT network to at least one volume or LUN maintained on a storage system. Further, host computers can issue requests to the storage system to read the collected data from the volume or LUN, perform processing on the collected data such as cleaning missing or faulty data, pruning irrelevant data, tagging or marking data, and/or other data processing operations, and issue requests to write the processed data back to at least one volume or LUN maintained on the storage system for subsequent retrieval and analysis. Unfortunately, however, the amount of data that can be collected by such IoT devices and streamed over the IoT network to a storage system can be enormous, possibly exceeding the available network bandwidth. Moreover, the servicing of a multitude of read and write requests issued by host computers to access such an enormous amount of data from the storage system can be costly in terms of both storage processing time and resources.

Techniques are disclosed herein for supporting a native pipeline element abstract that can be used for processing and storing data objects in a storage environment, including an IoT environment. The disclosed techniques can employ a data object processing pipeline implemented on a storage system with a series of functional units referred to herein as "data object processing elements" or "pipeline elements (PEs)." Each pipeline element (PE) can have several components including a data object processing application (or "PE application") and a storage queue, which can be hosted on a volume or LUN maintained on the storage system. During data ingest in an IoT environment, many IoT devices can generate, over an IoT network, data write events to a first PE of the data object processing pipeline, causing data objects to be successively written to a tail of a storage queue of the first PE. Once each data object is written to the storage queue of the first PE, the storage system can write the data object to a volume or LUN upon which the storage queue is hosted, at an offset corresponding to an address of the tail pointer in the storage queue. The writing of the data object to the storage queue can automatically trigger execution of a PE application of the first PE, causing at least one data object to be read from a head of the storage queue and first processing to be performed on the data object by the PE application.

Having performed the first processing on the data object at the first PE, the PE application of the first PE can generate a data write event to a second PE of the data object processing pipeline, causing the first processed data object to be written to a tail of a storage queue of the second PE. Once the first processed data object is written to the storage queue of the second PE, the storage system can write the data object to a volume or LUN upon which the storage queue of the second PE is hosted, at an offset corresponding to an address of the tail pointer in the storage queue. The writing of the data object to the storage queue of the second PE can automatically trigger execution of a PE application of the second PE, causing at least one data object to be read from a head of the storage queue of the second PE and second processing to be performed on the data object by the PE application of the second PE. Such generating of data write events and processing of data objects can continue at one or more subsequent successive PEs of the data object processing pipeline until a last PE is reached, at which point the multiply processed data objects can be stored to a volume or LUN maintained on the storage system. The multiply processed data objects can then be provided from the storage system to a host computer for subsequent use or analysis.

By implementing a data object processing pipeline for execution on a storage system, ingesting, by the data object processing pipeline, data collected by a plurality of computerized devices communicably coupled to the storage system, performing queuing and processing of data objects corresponding to the collected data at a series of processing elements of the data object processing pipeline, and providing the processed data objects from the storage system to a host computer for subsequent use or analysis, the number of storage IO requests (e.g., read requests, write requests) needed to be handled by the storage system during data ingest and retrieval can be reduced. Moreover, because the data object processing pipeline can be implemented and executed on the storage system, the processing and storing of ingested data objects in a storage environment, including an IoT environment, can be performed more efficiently and optimized more easily.

In certain embodiments, a method includes ingesting, by a data object processing pipeline of a storage system, a plurality of data objects from a computer or computerized device communicably coupled to the storage system, processing the plurality of data objects at a series of pipeline elements of the data object processing pipeline, and providing the plurality of processed data objects from the storage system to the same computer or computerized device or other computer or computerized device communicably coupled to the storage system for subsequent use or analysis.

In certain arrangements, the series of pipeline elements include a plurality of data object processing applications, respectively. The method further includes receiving, at the storage system from the same computer or computerized device or other computer or computerized device, a first control command to create or preconfigure a first data object processing application from among the plurality of data object processing applications.

In certain arrangements, the method further includes receiving, at the storage system from the same computer or computerized device or other computer or computerized device, at least a second control command to create or preconfigure at least a second data object processing application from among the plurality of data object processing applications.

In certain arrangements, one or more of the series of pipeline elements further include one or more storage queues, respectively. The method further includes receiving, at the storage system from the same computer or computerized device or other computer or computerized device, a third control command to create or preconfigure a first storage queue from among the one or more storage queues.

In certain arrangements, the method further includes hosting the first storage queue on a first storage object maintained on a first storage device of the storage system.

In certain arrangements, a first pipeline element from among the series of pipeline elements includes a first storage queue. The method further includes receiving a data write event at the first pipeline element, and, in response to receiving the data write event at the first pipeline element, writing a first data object from among the plurality of data objects to a tail of the first storage queue.

In certain arrangements, the first pipeline element further includes a first data object processing application. The method further includes, in response to writing the first data object to the tail of the first storage queue, automatically triggering execution of the first data object processing application.

In certain arrangements, the method further includes, in response to automatically triggering execution of the first data object processing application, reading a second data object from among the plurality of data objects from a head of the first storage queue, performing, by the first data object processing application, first processing on the second data object, and writing the second data object to a second pipeline element from among the series of pipeline elements.

In certain arrangements, the second pipeline element includes a second data object processing application. The method further includes, in response to writing the second data object to the second pipeline element, automatically triggering execution of the second data object processing application.

In certain arrangements, the method further includes, in response to automatically triggering execution of the second data object processing application, performing, by the second data object processing application, second processing on the second data object.

In certain arrangements, the method further includes, in response to performing the second processing on the second data object, storing the second data object to a second storage object maintained on a second storage device of the storage system.

In certain embodiments, a storage system includes a data object processing pipeline, a memory, and processing circuitry configured to execute program instructions out of the memory to ingest, by the data object processing pipeline, a plurality of data objects from a computer or computerized device communicably coupled to the storage system, process the plurality of data objects at a series of pipeline elements of the data object processing pipeline, and provide the plurality of processed data objects from the storage system to the same computer or computerized device or other computer or computerized device communicably coupled to the storage system for subsequent use or analysis.

In certain arrangements, the series of pipeline elements include a plurality of data object processing applications, respectively, and the processing circuitry is further configured to execute the program instructions out of the memory to receive, from the same computer or computerized device or other computer or computerized device, a first control command to create or preconfigure a first data object processing application from among the plurality of data object processing applications.

In certain arrangements, the processing circuitry is further configured to execute the program instructions out of the memory to receive from the same computer or computerized device or other computer or computerized device, at least a second control command to create or preconfigure at least a second data object processing application from among the plurality of data object processing applications.

In certain arrangements, one or more of the series of pipeline elements further include one or more storage queues, respectively, and the processing circuitry is further configured to execute the program instructions out of the memory to receive, from the same computer or computerized device or other computer or computerized device, a third control command to create or preconfigure a first storage queue from among the one or more storage queues.

In certain arrangements, the storage system further includes a first storage device, and the processing circuitry is further configured to execute the program instructions out of the memory to host the first storage queue on a first storage object maintained on the first storage device of the storage system.

In certain embodiments, a computer program product includes a set of non-transitory, computer-readable media having instructions that, when executed by processing circuitry, cause the processing circuitry to perform a method including ingesting, by a data object processing pipeline of a storage system, a plurality of data objects from a computer or computerized device communicably coupled to the storage system, processing the plurality of data objects at a series of pipeline elements of the data object processing pipeline, and providing the plurality of processed data objects from the storage system to the same computer or computerized device or other computer or computerized device communicably coupled to the storage system for subsequent use or analysis.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for supporting a native pipeline element abstract for use in processing and storing data objects in a storage environment, such as an Internet of Things (IoT) environment. The disclosed techniques can include implementing a data object processing pipeline for execution on a storage system, and ingesting, by the data object processing pipeline, data collected by a plurality of computerized devices, such as IoT devices, communicably coupled to the storage system. The disclosed techniques can further include performing queuing and processing of data objects corresponding to the collected data at a series of processing elements (PEs) of the data object processing pipeline, and providing the processed data objects from the storage system to a client (or "host") computer for subsequent use or analysis.

Figure 1A:
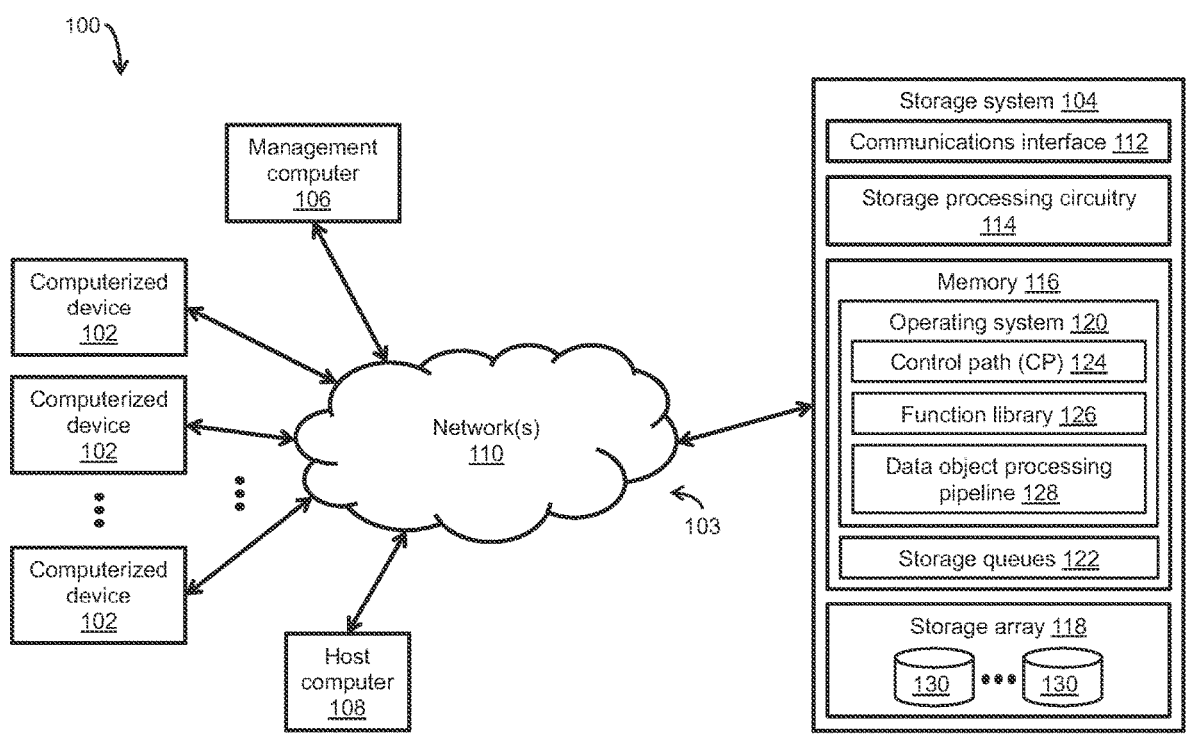
FIG. 1a is a block diagram of an exemplary storage environment, in which techniques can be practiced for supporting a native pipeline element abstract for use in processing and storing data objects.

FIG. 1a depicts an illustrative embodiment of an exemplary storage environment 100 for supporting a native pipeline element abstract for use in processing and storing data objects. As shown in FIG. 1a, the storage environment 100 can include a plurality of computerized devices 102, a management computer 106, and a host computer 108, each of which can be communicably coupled to a storage system 104 by a communications medium 103 that includes at least one network 110. In one embodiment, the storage environment 100 can include an IoT environment, the network(s) 110 can include an IoT network, and the plurality of computerized devices 102 can include many IoT devices (e.g., up to a million or more). For example, each such IoT device may include at least one sensor configured to monitor one or more conditions within the IoT environment and collect data for transmission over the IoT network to the storage system 104. Such IoT devices can include consumer IoT devices (e.g., smart televisions, smart speakers, toys, wearables, smart appliances), enterprise IoT devices (e.g., smart locks, smart thermostats, smart lighting, smart security devices), and/or industrial IoT devices (e.g., assembly line monitors, manufacturing process monitors). Each of the management computer 106 and the host computer 108 can be configured as a client computer, a server computer, or any other suitable computer or computerized device. The storage system 104 can be configured as a standalone storage system including a single storage appliance, a clustered storage system including two or more storage appliances, a cloud-based storage system, or any other suitable storage system.

As further shown in FIG. 1a, the storage system 104 can include a communications interface 112, storage processing circuitry 114, a memory 116, and a storage array 118. The communications interface 112 can include an Ethernet interface, an InfiniBand interface, a Fiber Channel interface, or any other suitable communications interface. The communications interface 112 can further include small computer system interface (SCSI) target adapters, network interface adapters, or any other suitable adapters for converting electronic, optical, or wireless signals received over the network(s) 110 to a form suitable for use by the storage processing circuitry 114.

The storage processing circuitry 114 can be configured to process storage input/output (IO) requests (e.g., SCSI commands, network file system (NFS) commands) issued by the host computer 108 and store host data in a redundant array of independent disk (RAID) environment implemented on the storage array 118. The storage array 118 can include storage drives 130 such as solid-state drives (SSDs), hard disk drives (HDDs), flash drives, hybrid drives, or any other suitable storage drives. The storage drives 130 can be configured to store volumes (VOLs), logical units (LUNs), virtual volumes (VVOLs), filesystems, or any other suitable storage objects for hosting data storage of host and device applications within the IoT environment.

The memory 116 can include persistent memory (e.g., flash memory, magnetic memory) and non-persistent cache memory (e.g., dynamic random-access memory (DRAM), static random-access memory (SRAM)). The memory 116 can further include an operating system (OS) 120 such as a Linux OS, Unix OS, Windows OS, or any other suitable operating system, as well as a plurality of storage queues 122. The memory 116 can be configured to store a variety of software constructs realized in the form of specialized code and data including a control path (CP) 124, a function library 126, and a data object processing pipeline 128.

The CP 124 can represent a logical flow of control commands through hardware and software components or layers of the storage system 104. The data object processing pipeline 128 can include a series of functional units referred to herein as "data object processing elements" or "pipeline elements (PEs)." Each pipeline element (PE) can include or be associated with one or more components including a data object processing application (or "PE application") and/or one of the storage queues 122, each of which can be hosted on a volume (VOL) or logical unit (LUN) maintained on the storage system. For example, the data object processing pipeline 128 may be part of a hyperconverged system that includes a plurality of virtual containers, such as Docker® containers or any other suitable software containers. Further, each virtual container may include a virtual machine (VM) configured to execute a PE application. During execution, each PE application component of a pipeline element (PE) can call one or more functions from the function library 126 to perform operations including reading data objects from a storage queue associated with the PE, writing data objects to a storage queue associated with a next PE in the data object processing pipeline 128, and so on. Such specialized code and data stored in the memory 116 can be accessed or executed by the storage processing circuitry 114 and/or virtual machines (VMs) to carry out the techniques and/or methods described herein.

In the context of the storage processing circuitry 114 and/or VMs being configured to execute specialized code and data (e.g., program instructions) out of the memory 116, a computer program product can be configured to deliver all or a portion of the program instructions stored and/or maintained in the memory 116 to the storage processing circuitry 114. Such a computer program product can include one or more non-transient computer-readable storage media such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. The non-transient computer-readable storage media can be encoded with sets of program instructions for performing, when executed by the storage processing circuitry 114 and/or VMs, the techniques and/or methods described herein.

The communications medium 103 can be configured to interconnect the computerized devices 102, the management computer 106, and the host computer 108 with the storage system 104 to enable them to communicate and exchange data and control signaling. As shown in FIG. 1a, the communications medium 103 can be illustrated as a "cloud" to represent different network topologies such as a storage area network (SAN) topology, a network-attached storage (NAS) topology, a direct-attached storage (DAS) topology, a local area network (LAN) topology, a metropolitan area network (MAN) topology, a wide area network (WAN) topology, or any suitable combination thereof. As such, the communications medium 103 can include copper-based data communications devices and cabling, fiber optic devices and cabling, wireless devices, and so on, or any suitable combination thereof.

Figure 1B:
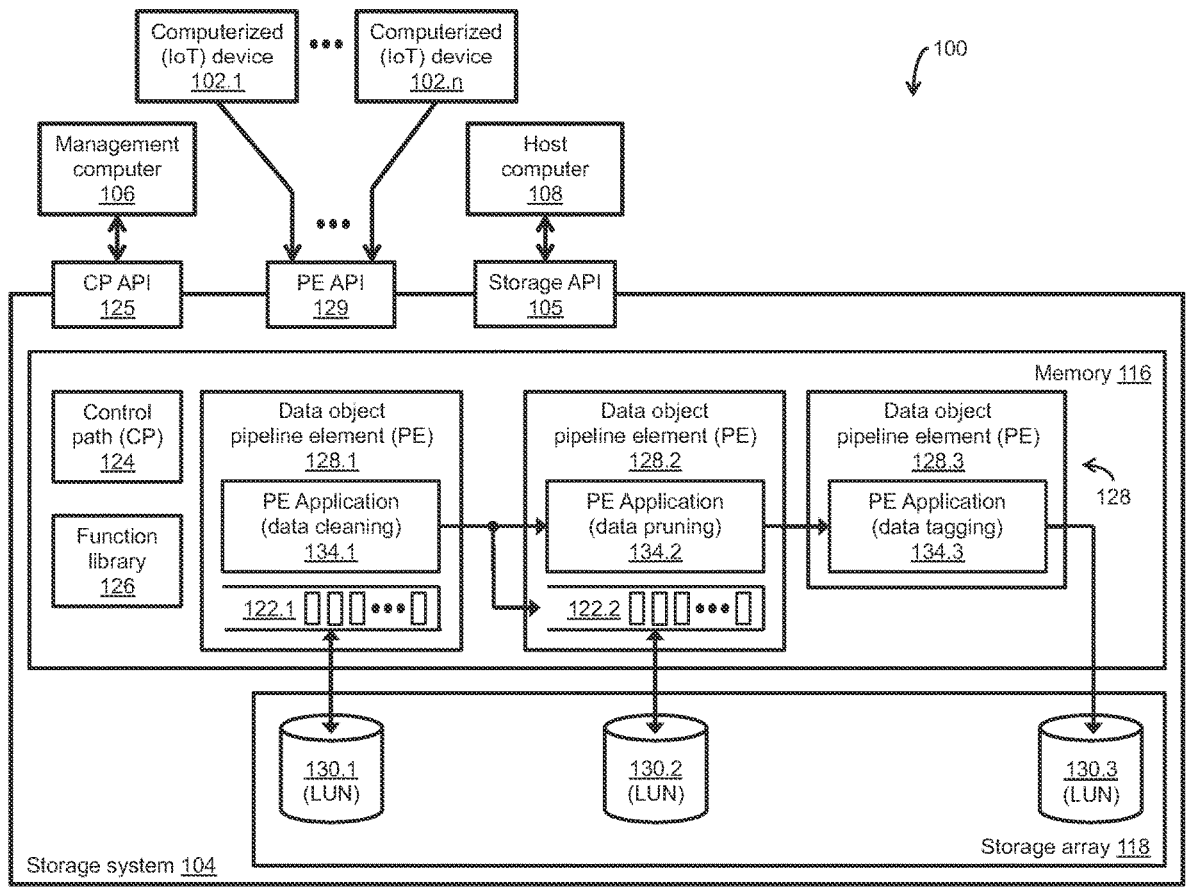
FIG. 1b is a block diagram of a detailed embodiment of an exemplary storage system implemented in the storage environment of FIG. 1a, in which the storage system includes an exemplary data object processing pipeline for processing and storing the data objects.

FIG. 1b depicts an exemplary detailed embodiment of the storage system 104 implemented in the storage environment 100 of FIG. 1a. As shown in FIG. 1b, the storage system 104 includes the memory 116 and the storage array 118. Further, the memory 116 includes the control path (CP) 124, the function library 126, and the data object processing pipeline 128. In this embodiment, the storage array 118 can include at least three (3) storage drives 130.1, 130.2, 130.3, and the data object processing pipeline 128 can include a series of at least three (3) data object processing elements (PEs) 128.1, 128.2, 128.3. The PE 128.1 can include a PE application 134.1 and a storage queue 122.1, which can be hosted on a logical unit (LUN) stored on the storage drive 130.1. Likewise, the PE 128.2 can include a PE application 134.2 and a storage queue 122.2, which can be hosted on a LUN stored on the storage drive 130.2. The PE 128.3 can include at least a PE application 134.3. The PE application 134.1 of the PE 128.1 can call one or more functions from the function library 126 to read data objects from the storage queue 122.1, write data objects to the storage queue 122.2 of the PE 128.2, as well as perform predetermined first processing (e.g., data cleaning) on the data objects. The PE application 134.2 of the PE 128.2 can call one or more functions from the function library 126 to read data objects from the storage queue 122.2, write data objects to the PE application 134.3, as well as perform predetermined second processing (e.g., data pruning) on the data objects. The PE application 134.3 of the PE 128.3 can call one or more functions from the function library 126 to write data objects to a LUN stored on the storage drive 130.3, as well as perform predetermined third processing (e.g., data tagging) on the data objects.

As described herein, the CP 124 can represent a logical flow of control commands through hardware and software components or layers of the storage system 104. Such control commands can be issued from a storage management application running on the management computer 106. By calling method functions of a CP application programming interface (API) 125, such control commands can initiate or perform operations to create and/or preconfigure the PEs 128.1, 128.2, 128.3 of the data object processing pipeline 128, create, preconfigure, and/or execute the PE applications 134.1, 134.2, 134.3 included in the PEs 128.1, 128.2, 128.3, respectively, and create and/or preconfigure the storage queues 122.1, 122.2 associated with the PEs 128.1, 128.2, respectively. As further described herein, the plurality of computerized devices 102 can include many IoT devices such as IoT devices 102.1, . . . , 102.n, each of which can include at least one sensor configured to collect data within an IoT environment. Such data collected by the IoT devices 102.1, . . . , 102.n can be ingested, via a PE API 129, at one or more of the PEs 128.1, 128.2, 128.3 of the data object processing pipeline 128. In addition, the host computer 108 can initiate or perform storage operations (e.g., read operations, write operations) on the storage drives 130.1, 130.2, 130.3 by calling method functions of a storage API 105.

The disclosed techniques for supporting a native pipeline element abstract for use in processing and storing data objects in a storage environment, including an IoT environment, will be further understood with reference to the following illustrative example and FIG. 1b. In this example, it is assumed that the many IoT devices 102.1, . . . , 102.n monitor conditions within the IoT environment and collect data for transmission (e.g., as data blocks) over an IoT network to the storage system 104. Before such data blocks are transmitted and received at the storage system 104, the management computer 106 executes a storage management application to create and/or preconfigure the data object processing pipeline 128 implemented within the memory 116 of the storage system 104.

To that end, the storage management application running on the management computer 106 issues control commands to the CP API 125 to create and/or preconfigure the pipeline elements (PEs) 128.1, 128.2, 128.3 of the data object processing pipeline 128. In this example, the PE 128.1 is created and/or preconfigured to include the PE application 134.1, which can be executed to perform cleaning operations ("data cleaning") on data objects (e.g., data blocks) transmitted over the IoT network to the storage system 104. For example, such data cleaning operations may include detecting, replacing, modifying, and/or deleting incomplete, incorrect, inaccurate, missing, and/or faulty data blocks. The PE 128.2 is created and/or preconfigured to include the PE application 134.2, which can be executed to perform pruning operations ("data pruning") on cleaned data objects (e.g., data blocks) provided by the PE 128.1. For example, such data pruning operations may include removing irrelevant data blocks or data blocks older than a specified time period (e.g., seconds, minutes, hours). The PE 128.3 is created and/or preconfigured to include the PE application 134.3, which can be executed to perform tagging operations ("data tagging") on cleaned and pruned data objects (e.g., data blocks) provided by the PE 128.2. For example, such data tagging operations may include marking certain data blocks as being secret, local, and/or sensitive. It should be noted that the pipeline elements (PEs) 128.1, 128.2, 128.3 of the data object processing pipeline 128 can be created and/or preconfigured to perform any other suitable data processing or data preparation operations on any other suitable data objects transmitted over the IoT network for receipt at the storage system 104. Further in this example, the PE 128.1 is created and/or preconfigured to include the storage queue 122.1, and the PE 128.2 is created and/or preconfigured to include the storage queue 122.2. As described herein, the storage queue 122.1 can be hosted on a LUN stored on the storage drive 130.1 of the storage array 118, and the storage queue 122.2 can be hosted on a LUN stored on the storage drive 130.2 of the storage array 118. As such, in this example, each storage queue 122.1, 122.2 can be created and/or preconfigured to have a specified size for use in tracking where data objects (e.g. data blocks) are ultimately written on the LUN that hosts the storage queue.

Having monitored conditions within the IoT environment and collected data for transmission (e.g., as data blocks) to the storage system 104, the IoT devices 102.1, . . . , 102.n generate, using the PE API 129, data write events to the PE 128.1 of the data object processing pipeline 128, causing data blocks of a specified size to be successively written to a tail of the storage queue 122.1. Once each data block has been written to the storage queue 122.1, the storage system 104 writes it to the LUN stored on the storage drive 130.1 upon which the storage queue 122.1 is hosted, at an offset corresponding to an address of the tail pointer in the storage queue 122.1. Further, the event of writing a data block to the storage queue 122.1 automatically triggers execution of the PE application 134.1, causing a read function to be called from the function library 126 for reading at least one data block of the specified size from a head of the storage queue 122.1 and data cleaning operations to be performed on the data block by the PE application 134.1.

Having performed the data cleaning operations on the data block(s) at the PE 128.1, the PE application 134.1 calls a write function from the function library 126 for successively writing at least one cleaned data block to a tail of the storage queue 122.2. Once the cleaned data block has been written to the storage queue 122.2, the storage system 104 writes it to the LUN stored on the storage drive 130.2 upon which the storage queue 122.2 is hosted, at an offset corresponding to an address of the tail pointer in the storage queue 122.2. Further, the event of writing a data block to the storage queue 122.2 automatically triggers execution of the PE application 134.2, causing a read function to be called from the function library 126 for reading at least one data block from a head of the storage queue 122.2 and data pruning operations to be performed on the data block by the PE application 134.2.

Having performed the data pruning operations on the cleaned data block(s) at the PE 128.2, the PE application 134.2 calls a write function from the function library 126 for writing at least one cleaned and pruned data block to the PE application 134.3. Further, the event of writing a data block to the PE application 134.3 automatically triggers its execution, causing data tagging operations to be performed on the data block by the PE application 134.3. The storage system 104 then writes each cleaned, pruned, tagged, or otherwise processed data block to a LUN stored on the storage drive 130.3. At a later time, the host computer 108 can initiate or perform one or more read operations on the storage drive 130.3 to access or consume the processed data block(s) using the storage API 105. For example, the host computer 108 may use such processed data blocks to train a model for a machine learning (ML) application or any other suitable use or analysis.

Figure 2:
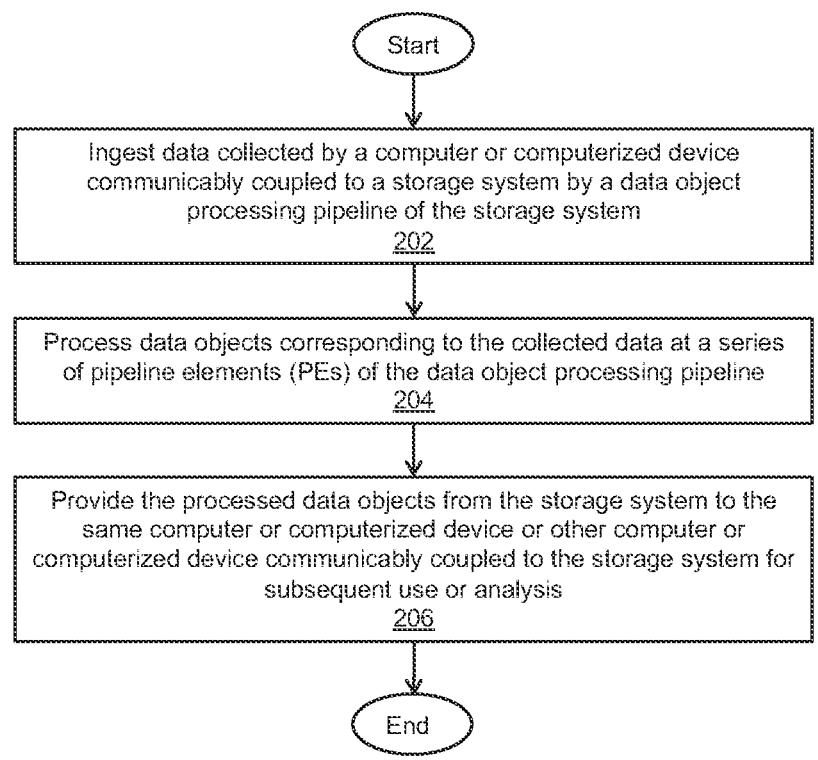
FIG. 2 is a flow diagram of an exemplary method of the data object processing pipeline included in the storage system of FIG. 1b.

A method of a data object processing pipeline of a storage system is described below with reference to FIG. 2. As depicted in block 202, data collected by a computer or computerized device communicably coupled to a storage system is ingested by a data object processing pipeline of the storage system. As depicted in block 204, data objects corresponding to the collected data are processed at a series of processing elements (PEs) of the data object processing pipeline. As depicted in block 206, the processed data objects are provided from the storage system to the same computer or computerized device or other computer or computerized device communicably coupled to the storage system for subsequent use or analysis. In this way, the number of storage IO requests (e.g., read requests, write requests) needed to be handled by the storage system during data ingest and retrieval can be reduced. Moreover, because the data object processing pipeline can be implemented and executed on the storage system, the processing and storing of ingested data objects in a storage environment, including an IoT environment, can be performed more efficiently and optimized more easily.

Having described the above illustrative embodiments, various alternative embodiments and/or variations may be made and/or practiced. For example, it was described herein that the management computer 106 (see FIGS. 1a and 1b) can issue control commands to initiate or perform operations to create and/or preconfigure PEs of the data object processing pipeline 128, create, preconfigure, and/or execute PE applications included in the respective PEs, and create and/or preconfigure storage queues associated with the respective PEs. In an alternative embodiment, such controlling, creating, and/or preconfiguring of the data object processing pipeline 128 implemented on the storage system 104 can be performed over the network(s) 110 by the host computer 108 (see FIGS. 1a and 1b) or any other suitable computer or computerized device.

It was further described herein that the many IoT devices 102.1, . . . , 102.n (see FIG. 1b) can collect data for transmission to the storage system 104 for data processing or data preparation by the data object processing pipeline 128. In an alternative embodiment, such data to be processed or prepared by the data object processing pipeline 128 can be resident on one or more of the storage drives 130 of the storage array 118 (see FIG. 1a).

It was further described herein that the PE applications executed within the data object processing pipeline 128 can call one or more functions from the function library 126 (see FIGS. 1a and 1b) to perform operations including reading data objects from a storage queue associated with a first PE of the data object processing pipeline 128, writing data objects to a storage queue associated with a next PE in the data object processing pipeline 128, and so on. In an alternative embodiment, such PE applications can perform read operations, write operations, or any other suitable operations by executing one or more Python scripts or any other suitable scripts.

It was further described herein that once each data object (e.g., data block) has been written to a storage queue of the data object processing pipeline 128, the storage system 104 can write it to a LUN (or any other suitable storage object) stored on a storage drive upon which the storage queue is hosted. In an alternative embodiment, the storage system 104 can write such data objects to memory-mapped addresses of cache memory locations or any other suitable memory locations.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)).

As employed herein, the term "storage array" may refer to a storage system used for block-based, file-based, or other object-based storage. Such a storage array may include, for example, dedicated storage hardware containing HDDs, SSDs, and/or all-flash drives.

As employed herein, the term "storage entity" may refer to a filesystem, an object storage, a virtualized device, a logical unit (LUN), a logical volume (LV), a logical device, a physical device, and/or a storage medium.

As employed herein, the term "LUN" may refer to a logical entity provided by a storage system for accessing data from the storage system and may be used interchangeably with a logical volume (LV). The term "LUN" may also refer to a logical unit number for identifying a logical unit, a virtual disk, or a virtual LUN.

As employed herein, the term "physical storage unit" may refer to a physical entity such as a storage drive or disk or an array of storage drives or disks for storing data in storage locations accessible at addresses. The term "physical storage unit" may be used interchangeably with the term "physical volume."

As employed herein, the term "storage medium" may refer to a hard drive or flash storage, a combination of hard drives and flash storage, a combination of hard drives, flash storage, and other storage drives or devices, or any other suitable types and/or combinations of computer readable storage media. Such a storage medium may include physical and logical storage media, multiple levels of virtual-to-physical mappings, and/or disk images. The term "storage medium" may also refer to a computer-readable program medium.

As employed herein, the term "IO request" or "IO" may refer to a data input or output request such as a read request or a write request.

As employed herein, the terms, "such as," "for example," "e.g.," "exemplary," and variants thereof refer to non-limiting embodiments and have meanings of serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optionally" has a meaning that a feature, element, process, etc., may be provided in certain embodiments and may not be provided in certain other embodiments. Any particular embodiment of the present disclosure may include a plurality of optional features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method comprising:
   providing a data object processing pipeline application for execution by processing circuitry included in a storage system, the data object processing pipeline application having a series of pipeline components including a first pipeline component and a second pipeline component;
   executing, by the processing circuitry, the first pipeline component of the data object processing pipeline application, including:
   ingesting a plurality of data objects from a computer or computerized device communicably coupled to the storage system;
   successively writing the plurality of data objects to a first storage queue hosted on at least one storage object stored on at least one storage drive of the storage system; and
   processing the plurality of data objects by calling a first plurality of functions from a function library included in the storage system, the calling of the first plurality of functions causing the plurality of data objects to be read from the first storage queue, causing a first processing operation to be performed on the plurality of data objects, and causing the plurality of data objects processed by the first processing operation to be successively written to a second storage queue hosted on the at least one storage object stored on the at least one storage drive of the storage system;
   executing, by the processing circuitry, the second pipeline component of the data object processing pipeline application, including:
   further processing the plurality of data objects by calling a second plurality of functions from the function library included in the storage system, the calling of the second plurality of functions causing the plurality of data objects processed by the first processing operation to be read from the second storage queue, and causing a second processing operation to be performed on the plurality of data objects processed by the first processing operation; and
   providing the plurality of data objects processed by at least the first processing operation and the second processing operation from the storage system to the same computer or computerized device or other computer or computerized device communicably coupled to the storage system for subsequent use or analysis.

2. The method of claim 1 wherein the first pipeline component includes a first data object processing application, and wherein the method further comprises:
   receiving, at the storage system from the same computer or computerized device or other computer or computerized device, a first control command to create or preconfigure the first data object processing application.

3. The method of claim 2 wherein the second pipeline component includes a second data object processing application, and wherein the method further comprises:
   receiving, at the storage system from the same computer or computerized device or other computer or computerized device, at least a second control command to create or preconfigure the second data object processing application.

4. The method of claim 2 further comprising:
   receiving, at the storage system from the same computer or computerized device or other computer or computerized device, a third control command to create or preconfigure the first storage queue.

5. The method of claim 4 further comprising:
   hosting the first storage queue on the at least one storage object stored on the at least one storage drive of the storage system.

6. The method of claim 1 wherein the first storage queue has a plurality of queue elements including a tail element and a head element, the tail element pointing to a last queue element of the plurality of queue elements, the head element pointing to a first queue element of the plurality of queue elements, and wherein the ingesting of the plurality of data objects includes:
   receiving a data write event at the first pipeline component of the data object processing pipeline application; and
   in response to receiving the data write event at the first pipeline component, writing a first data object from among the plurality of data objects to the tail element of the first storage queue.

7. The method of claim 6 wherein the first pipeline component includes a first data object processing application, and wherein the method further comprises:
in response to writing the first data object to the tail element of the first storage queue, automatically triggering execution of the first data object processing application.

8. The method of claim 7 further comprising:
in response to automatically triggering execution of the first data object processing application:
reading a second data object from among the plurality of data objects from the head element of the first storage queue,
wherein the processing of the plurality of data objects includes performing, by the first data object processing application, the first processing operation on the second data object; and
writing the second data object to the second storage queue.

9. The method of claim 8 wherein the second pipeline component includes a second data object processing application, and wherein the method further comprises:
in response to writing the second data object to the second storage queue, automatically triggering execution of the second data object processing application.

10. The method of claim 9 further comprising:
in response to automatically triggering execution of the second data object processing application, performing, by the second data object processing application, the second processing operation on the second data object.

11. The method of claim 10 further comprising:
in response to performing the second processing operation on the second data object, storing the second data object to the at least one storage object stored on the at least one storage drive of the storage system.

12. The method of claim 1:
wherein the first processing operation includes a data cleaning operation,
wherein the second processing operation includes a data pruning operation,
wherein the causing of the first processing operation to be performed on the plurality of data objects includes causing the data cleaning operation to be performed on the plurality of data objects, and
wherein the causing of the second processing operation to be performed on the plurality of data objects processed by the first processing operation includes causing the data pruning operation to be performed on the plurality of data objects processed by the data cleaning operation.

13. A storage system comprising:
a memory including a data object processing pipeline application, the data object processing pipeline application having a series of pipeline components including a first pipeline component and a second pipeline component; and
processing circuitry configured to execute the first pipeline component of the data object processing pipeline application out of the memory to:
ingest a plurality of data objects from a computer or computerized device communicably coupled to the storage system;
successively write the plurality of data objects to a first storage queue hosted on at least one storage object stored on at least one storage drive of the storage system; and
process the plurality of data objects by calling a first plurality of functions from a function library included in the storage system, the calling of the first plurality of functions causing the plurality of data objects to be read from the first storage queue, causing a first processing operation to be performed on the plurality of data objects, and causing the plurality of data objects processed by the first processing operation to be successively written to a second storage queue hosted on the at least one storage object stored on the at least one storage drive of the storage system,
wherein the processing circuitry is further configured to execute the second pipeline component of the data object processing pipeline application out of the memory to:
further process the plurality of data objects by calling a second plurality of functions from the function library included in the storage system, the calling of the second plurality of functions causing the plurality of data objects processed by the first processing operation to be read from the second storage queue, and causing a second processing operation to be performed on the plurality of data objects processed by the first processing operation; and
wherein the processing circuitry is further configured to execute program instructions out of the memory to:
provide the plurality of data objects processed by at least the first processing operation and the second processing operation from the storage system to the same computer or computerized device or other computer or computerized device communicably coupled to the storage system for subsequent use or analysis.

14. The storage system of claim 13 wherein the first pipeline component includes a first data object processing application, and wherein the processing circuitry is further configured to execute the program instructions out of the memory to receive, from the same computer or computerized device or other computer or computerized device, a first control command to create or preconfigure the first data object processing application.

15. The storage system of claim 14 wherein the second pipeline component includes a second data object processing application, and wherein the processing circuitry is further configured to execute the program instructions out of the memory to receive from the same computer or computerized device or other computer or computerized device, at least a second control command to create or preconfigure the second data object processing application.

16. The storage system of claim 14 wherein the processing circuitry is further configured to execute the program instructions out of the memory to receive, from the same computer or computerized device or other computer or computerized device, a third control command to create or preconfigure the first storage queue.

17. The storage system of claim 16
wherein the processing circuitry is further configured to execute the program instructions out of the memory to host the first storage queue on the at least one storage object stored on the at least one storage drive of the storage system.

18. A computer program product including a set of non-transitory, computer-readable media having instructions that, when executed by processing circuitry, cause the processing circuitry to perform a method comprising:

providing a data object processing pipeline application for execution by processing circuitry included in a storage system, the data object processing pipeline application having a series of pipeline components including a first pipeline component and a second pipeline component;

executing, by the processing circuitry, the first pipeline component of the data object processing pipeline application, including:
   ingesting a plurality of data objects from a computer or computerized device communicably coupled to the storage system;
   successively writing the plurality of data objects to a first storage queue hosted on at least one storage object stored on at least one storage drive of the storage system; and
   processing the plurality of data objects by calling a first plurality of functions from a function library included in the storage system, the calling of the first plurality of functions causing the plurality of data objects to be read from the first storage queue, causing a first processing operation to be performed on the plurality of data objects, and causing the plurality of data objects processed by the first processing operation to be successively written to a second storage queue hosted on the at least one storage object stored on the at least one storage drive of the storage system;

executing, by the processing circuitry, the second pipeline component of the data object processing pipeline application, including:
   further processing the plurality of data objects by calling a second plurality of functions from the function library included in the storage system, the calling of the second plurality of functions causing the plurality of data objects processed by the first processing operation to be read from the second storage queue, and causing a second processing operation to be performed on the plurality of data objects processed by the first processing operation; and providing the plurality of data objects processed by at least the first processing operation and the second processing operation from the storage system to the same computer or computerized device or other computer or computerized device communicably coupled to the storage system for subsequent use or analysis.

19. The computer program product of claim 18 wherein the first pipeline component includes a first data object processing application, and wherein the method further comprises:
   receiving, at the storage system from the same computer or computerized device or other computer or computerized device, a first control command to create or preconfigure the first data object processing application.

20. The computer program product of claim 19 wherein the second pipeline component includes a second data object processing application, and wherein the method further comprises:
   receiving, at the storage system from the same computer or computerized device or other computer or computerized device, at least a second control command to create or preconfigure the second data object processing application.

\* \* \* \* \*